Feb. 13, 1951
D. C. PRINCE
ELIMINATION OF VISCOUS DRAG
IN A MAGNETIC FLUID CLUTCH
Filed May 7, 1949
2,541,831
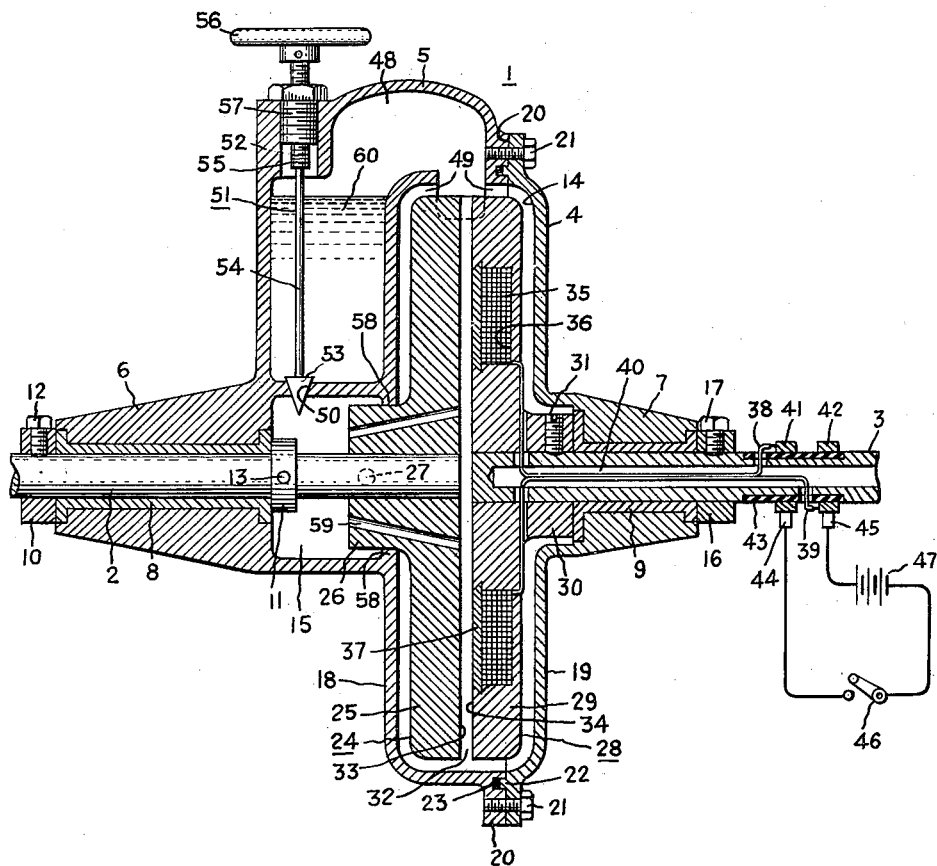
Inventor:
David C. Prince,
by Richard E. Hosley
His Attorney.

Patented Feb. 13, 1951

2,541,831

UNITED STATES PATENT OFFICE 2,541,831

ELIMINATION OF VISCOUS DRAG IN A
MAGNETIC FLUID CLUTCH

David C. Prince, Schenectady, N. Y., assignor to
General Electric Company, a corporation of
New York Application May 7, 1949, Serial No. 92,042

1 Claim. (Cl. 192—84)

My invention relates generally to magnetic fluid clutches and more particularly to an improved arrangement for the elimination of viscous drag therein when such clutches are operated in the released or disengaged condition.

In power-transmitting clutches of the magnetic fluid type, finely-divided particles of a magnetic material such as iron are suspended in a fluid such as oil, and the resultant mixture is caused, by virtue of a magnetic field acting thereon, to create a drag between a pair of rotatable members or plates. While the creation of such a magnetic fluid drag is the normal function of a clutch of the type mentioned when the clutch is energized or "engaged" for normal power-transmitting operation, it is frequently desirable to operate the clutch in the deenergized or "disengaged" condition, that is, without the presence of a magnetic field, so that the power-transmitting effect thereof is greatly reduced. Under such condition, while the effect of magnetic fluid drag is absent, the clutch may still function to an appreciable extent in the manner of a conventional fluid clutch by virtue of the presence of viscous drag between the clutch elements, due to the presence of the fluid mixture in the clutch chamber.

The presence of viscous drag may be undesirable in many applications, since the clutch is not truly disengaged even when a magnetic field is not present. An appreciable amount of torque may be transmitted by the clutch which may cause "creeping" of a load connected thereto. Moreover, such viscous drag may cause appreciable power losses which serve no useful purpose. In many applications, magnetic fluid clutches are at present altogether unsuitable because of continuing losses due to viscous drag. This is particularly true with respect to small clutches operating at high speed in an application such as a reversing gear wherein a drive operates during a large portion of the total time with one clutch fully engaged and the other completely disengaged. A further limitation imposed on clutch design by the presence of viscous drag lies in choice of a suitable gap dimension between the magnetic rotatable members of a clutch, to secure high operating torque and efficiency when the clutch is engaged without accompanying excessive viscous drag torque when the clutch is disengaged.

Accordingly, it is the principal object of my invention to provide an improvement in clutches of the magnetic fluid type, whereby viscous drag may be wholly eliminated therein when such clutches are operated in a disengaged condition.

In its broadest aspect, my invention provides for removal of the fluid mixture from the vicinity of the clutch plates when the clutch is disengaged, thereby eliminating viscous drag by virtue of the absence of a viscous medium. In particular, in a preferred embodiment of my invention hereinafter described, I provide an auxiliary reservoir connected to the main clutch chamber, and having a sufficient capacity to contain the entire fluid mixture normally contained in the main chamber when the clutch is engaged. The flow of the fluid from the clutch chamber to the reservoir or vice versa, is effected by the action on the fluid of centrifugal or suction forces associated with the rotational motion of the clutch, and such flow is controlled by the use of a suitable valve.

For a better understanding of my invention, together with other objects and advantages thereof, attention is now directed to the following description and the single figure of the accompanying drawing, wherein a clutch of the magnetic fluid type, including a preferred embodiment of my invention, is represented.

Referring now to the drawing, there is shown a power-transmitting clutch of the magnetic fluid type having the principal elements thereof contained in a housing 1, from which protrudes a pair of shafts 2 and 3, either of which may serve as a power input shaft while the other serves as a power output shaft. Housing 1 comprises a generally cylindrical hollow center portion 4, a hollow auxiliary portion 5 eccentrically positioned with respect to center portion 4, and a pair of cylindrical hub portions 6 and 7 coaxially positioned with respect to center portion 4 at the ends thereof. Hubs 6 and 7 are arranged to accommodate a pair of bearings 8 and 9, respectively, which support shafts 2 and 3. Shaft 2 is restrained from axial motion by a pair of suitable collars 10 and 11 which are maintained in fixed relation with shaft 2 by suitable fastening devices such as set-screws 12 and 13.

Housing 1 is represented as having a relatively large chamber 14 within center portion 4, and a smaller chamber 15 adjacent to and coaxial with chamber 14, but contained within hub portion 6. Shaft 2 extends through chamber 15 into chamber 14 and terminates therewithin. Shaft 3 likewise extends into and terminates within chamber 14, and is restrained from axial motion in the direction thereof by a collar 16 maintained in fixed relation with shaft 3 by a set-screw 17.

It will be understood that while housing 1 may be considered as an integral unit, it is preferably constructed in two or more sections to facilitate manufacture thereof and assembly of other clutch elements therewith. In the illustrated embodiment housing 1, which is formed of a non-magnetic material, preferably metal, is represented as comprising a duality of sections which may be conveniently designated as a body portion 18 and a cover portion 19. Body 18 and cover 19 are joined at a mating surface 20 and are maintained in clamping engagement by a series of bolts 21 spaced about the peripheries of body 18 and cover 19. Body 18 and cover 19 are maintained in coaxial relationship by a rabbet 22 having a gasket 23 clamped therein to render joining surface 20 tight against fluid leakage.

A clutch member 24, having a plate portion 25 and a hub portion 26, is carried by shaft 2 and is positioned at the end thereof within chamber 14, and is maintained in fixed relation with shaft 2 by a suitable fastening device such as a setscrew 27. A second clutch member 28, having a plate portion 29 and a hub portion 30 is carried by shaft 3 and is positioned at the end thereof within chamber 14, and is maintained in fixed relation with shaft 3 by set-screw 31. Shaft 3, restrained from axial motion in the direction of chamber 14 by collar 16, is similarly restrained from motion in the opposite direction by hub 30. Members 24 and 28 are positioned on shafts 2 and 3, respectively, in a manner to establish a suitable fixed gap distance 32 between faces 33 and 34.

Plates 25 and 29 are formed of a magnetic material such as iron. Plate 29 is provided with a magnetic winding which is represented as an annular winding 35 coaxially positioned with respect to plate 29 in a cylindrical recess 36 thereof. Recess 36 is covered by an annular plate 37 formed of a non-magnetic material, preferably metal. Winding 35 is connected by a pair of conductors 38 and 39, positioned in a passage 40 which is drilled or otherwise formed in shaft 3, to a pair of slip rings 41 and 42 fixed on shaft 3 outside housing 1 and insulated from each other and from shaft 3 by an insulating member 43. Slip rings 41 and 42 are connected through a pair of brushes 44 and 45 and a switch 46, to a suitable source of unidirectional potential such as battery 47.

Auxiliary portion 5 is represented as having a chamber 48 connected with chamber 14 in center portion 4 by a relatively large passage 49 at the periphery thereof. Chamber 48 is connected with chamber 15 in hub 6 by a relatively small passage 50 in the periphery thereof. While no provision is made for closing passage 49, provision is made to open or close passage 50 by the use of a valve mechanism 51 supported in a boss portion 52 of auxiliary portion 5, and arranged to be externally operable with respect thereto. In particular, passage 50 is represented as being a tapered hole which may form a seat for valve mechanism 51. Valve 51 is represented as comprising a tapered plug portion 53 arranged to mate with opening 50, a stem 54 attached to plug 53, an externally threaded rod 55 attached to stem 54, and a suitable handwheel 56 attached to threaded rod 55. Plug 53, stem 54, rod 55, and handwheel 56 are attached to one another in fixed rotational relation, so that rotation of handwheel 56 causes corresponding rotation of plug 53. Threaded rod 55 is threadedly engaged in an internally threaded sleeve 57 which is secured in fixed relation with respect to boss 52. Thus, rotation of handwheel 56 and plug 53 causes axial motion thereof, in turn causing opening or closing of passage 50 according to the sense of rotation of mechanism 51.

In connection with the clutch member 24 and chambers 14 and 15, it will be noted that a sealing wall 58 is provided around hub 26 between chambers 14 and 15 in the form of a ring integral with body 18 of housing 1. Wall 58 is arranged to fit closely about the periphery of hub 15, to prevent any appreciable flow of fluid therealong between chambers 14 and 15. Further, a plurality of tubular passageways 59 are provided in member 24 extending through hub 26 and plate 25 thereof, and interconnecting chamber 15 and gap 32.

In considering the operation of the clutch herein illustrated, it is assumed that shaft 2 is connected to a suitable source of driving torque, such as a motor (not shown), and that shaft 3 is similarly connected to a load device (not shown), the latter being driven through the clutch by coupling action between clutch members 24 and 28. Such coupling action is provided by the use of a "fluid mixture," designated in the drawing by numeral 60, comprising a relatively viscous fluid, such as oil, and finely-divided particles of a magnetic material, such as iron, suspended therein.

If it be assumed momentarily that chamber 14 is closed, or in other words that chambers 14 and 48 are not connected by passage 49, and that passage 50 is closed by plug 53, thereby isolating chamber 48 from chamber 15, the operation of the clutch may be first considered without regard to auxiliary chamber 48.

In normal operation of the clutch, fluid mixture 60 is contained in the interstices of chamber 14 surrounding clutch members 24 and 28 and, in particular, in gap 32 therebetween. If switch 46 is closed, a current is circulated through winding 35 and a magnetic field is created thereby in plates 25 and 29. In particular, the magnetic field thus created passes through gap 32 between plates 25 and 29 and also through that portion of fluid mixture 60 contained therebetween. The finely-divided particles of magnetic material suspended in mixture 60 are caused by the magnetic field passing therethrough to cling together and also to cling to surfaces 33 and 34 of plates 25 and 29. The clinging action thus effected causes a drag to be created between clutch members 24 and 28 when the former is rotated by the driving source connected to shaft 2, and thus a torque may be transmitted through the clutch to the load device connected to shaft 3. Under this condition, the clutch is engaged.

If it is desired to disengage the clutch, switch 46 is opened and the circuit of winding 35 is broken, thereby causing the magnetic field associated therewith to be reduced to substantially zero. The tendency of the finely-divided particles in mixture 60 to cling together and to cling to faces 33 and 34 is likewise reduced to substantially zero. Under this condition, no torque, due to magnetic action on fluid mixture 60, is transmitted by the clutch. However, due to the presence of a viscous medium in the vicinity of clutch members 24 and 28, an appreciable amount of torque may be transmitted by the clutch due to viscous drag, in the manner of a conventional fluid clutch. As previously noted, the presence of such torque may be undesirable in many applications. According to my invention, I provide for the complete elimination of such torque by removal of the viscous medium, represented in the illustrated embodiment by fluid mixture 60, from the vicinity of clutch members 24 and 28 when the clutch is disengaged.

It is now assumed that main clutch chamber 14 and auxiliary chamber 48 are interconnected by passage 49, as previously described and as shown in the drawing, and that fluid mixture 60 is contained in chamber 14. It is further assumed that switch 46 is closed and that torque is being transmitted through the clutch by virtue of magnetic action on fluid mixture 60, as previously described. In other words, the portion of mixture 60 contained in gap 32 between faces 33 and 34 may be considered to be "frozen" and, accordingly, to have no appreciable tendency to flow. If the clutch is now disengaged by de-energizing winding 35, mixture 60, due to the reduction of the magnetic field to substantially zero, is no longer "frozen" but is substantially liquid in form and may easily be caused to flow by centrifugal forces present in rotating members 24 and 28. There is, accordingly, a tendency for mixture 60 to be thrown out of gap 32 and to accumulate at the periphery of chamber 14.

By suitable design, mixture 60 may be caused to pass through opening 49 into chamber 48 and to accumulate therein, chamber 48 thereby performing the function of a reservoir. To cause such accumulation, passage 50 may be closed by manipulation of handwheel 56 and valve mechanism 51. Thus, in a short time, fluid mixture 60, previously contained in chamber 14, is completely thrown out of chamber 14 into reservoir chamber 48, leaving no viscous medium in chamber 14 to cause viscous drag in the disengaged clutch.

If it is now desired to re-engage the clutch, passage 50 may be opened by manipulation of hand-wheel 56 and valve mechanism 51, permitting the flow of mixture 60 contained in chamber 48 through passage 50 into chamber 15, by virtue of forces of gravity acting on mixture 60. As chamber 15 is filled by mixture 60, a pressure is created therein tending to force mixture 60 through tubular passageways 59 in clutch member 24 and thence into gap 32. Centrifugal forces in gap 32 tend to throw mixture 60 outward, in turn creating suction forces in passages 59 which tend to maintain a flow of mixture 60 through passages 59, even after chamber 48 is emptied and a fluid head no longer exists therein. If a magnetic field is not established between plates 25 and 29, the flow of fluid mixture 60 continues and mixture 60 is again thrown into chamber 48 and a continual recirculation occurs. However, when a sufficient time has elapsed following opening of passage 50 to permit a substantial portion of mixture 60 to be contained in gap 32, switch 46 may be closed, causing the mixture 60 in gap 32 to be frozen by magnetic action. Thus, normal power-transmitting action of the clutch may be resumed. It is desirable to close passage 50 following engagement of the clutch to permit the surplus of mixture 60 surrounding clutch members 24 and 28 in chamber 14 but not contained in gap 32, to be thrown out of chamber 14 and to be accumulated in chamber 48, thereby reducing the viscous drag on clutch members 24 and 28 during normal operation. Disengagement of the clutch then requires only opening of switch 46.

While the details of operation described are useful in understanding my invention, it will be understood that in the practical application of my invention, when it is desired to engage the clutch such an operation involves only manipulating handwheel 56 to its "open" position and, after a suitable time, closing switch 46, whereupon handwheel 56 is preferably manipulated to its "closed" position once again. Disengagement of the clutch then involves only opening switch 46. The functions of removing mixture 60 from chamber 14 and returning mixture 60 once again to chamber 14 are accomplished automatically in the illustrated embodiment by making use of centrifugal and gravity forces and the like associated with the clutch mechanism.

While I have shown a preferred embodiment of my invention, I wish to point out that the application of my invention is not necessarily limited thereto and variations thereof will undoubtedly occur to those skilled in the art. For example, while the valve mechanism 51 is herein represented as being manually operable, it is readily apparent that valve mechanism 51 could equally well be actuated remotely by a solenoid or the like. I aim, therefore, in the appended claim, to cover all such changes and modifications as fall within the true spirit and scope of my invention.

What I claim as new and desire to secure by Letters Patent of the United States is:

In a clutch of the magnetic fluid mixture type a housing defining an operating chamber and a storage chamber separated by a common wall with each chamber suitable for housing a magnetic fluid mixture, a pair of rotatable soft iron clutch members positioned in said operating chamber and spaced apart in parallel juxtaposition to define a gap, means including an electrical circuit for transmitting torque from one of said clutch members to the other by energizing said circuit to pass a magnetic field through said fluid in said gap, said common wall defining with said housing a passageway at the top of said operating chamber for conducting said magnetic fluid mixture by centrifugal force from said operating chamber to said storage chamber when said electrical circuit is de-energized, a valve positioned between said storage chamber and said operating chamber, and means for opening said valve to conduct said magnetic fluid from said storage chamber to said operating chamber.

DAVID C. PRINCE.

REFERENCES CITED

The following references are of record in the file of this patent:

UNITED STATES PATENTS

| Number | Name | Date |
|---|---|---|
| 2,182,049 | Henry | Dec. 5, 1939 |

FOREIGN PATENTS

| Number | Country | Date |
|---|---|---|
| 448,977 | Germany | Sept. 1, 1927 |
| 794,008 | France | Feb. 6, 1936 |

OTHER REFERENCES

Bureau of Standards Technical Report 1213, received in Div. 68, Mar. 30, 1948, 192–MFN.